United States Patent [19]

Oshita

[11] Patent Number: 5,729,578
[45] Date of Patent: Mar. 17, 1998

[54] DATA RECEIVER FOR REARRANGING THE FRAME PATTERN OF DATA RECEIVED

[75] Inventor: Shun Oshita, Tokyo, Japan

[73] Assignee: Oki Electric Industry Co., Ltd., Tokyo, Japan

[21] Appl. No.: 529,547

[22] Filed: Sep. 18, 1995

[30] Foreign Application Priority Data

Sep. 26, 1994 [JP] Japan .................................. 6-229406

[51] Int. Cl.⁶ ........................................................ H04L 7/00
[52] U.S. Cl. ............................................. 375/363; 370/505
[58] Field of Search ........................... 375/363; 370/505, 370/506

[56] References Cited

U.S. PATENT DOCUMENTS

| | | | |
|---|---|---|---|
| 4,053,715 | 10/1977 | Drapkin | 370/509 |
| 4,764,941 | 8/1988 | Choi | 375/363 |
| 4,885,746 | 12/1989 | Fukushima et al. | 370/506 |
| 5,113,395 | 5/1992 | Murakami et al. | 370/505 |
| 5,146,477 | 9/1992 | Cantoni et al. | 375/363 |
| 5,303,242 | 4/1994 | Kaneko | 370/506 |

OTHER PUBLICATIONS

"Line Transmission of Non–telephone Signals—Frame Structure for a 64 to 1920 kbit/s Channel in Audio–visual Teleservices", ITU–T Recommendation H.221(Mar. 1993), International Telecommunication Union, Geneva, 1994, pp. 1–28.

"Line Transmission of Non–telephone Signals—Narrow-Band Visual Telephone Systems and Terminal Equipment", ITU–T Recommendation H.320 (Mar. 1993), International Telecommunication Union, Geneva, 1994, pp. 1–12.

Primary Examiner—Stephen Chin
Assistant Examiner—Kevin Kim
Attorney, Agent, or Firm—Spencer & Frank

[57] ABSTRACT

A data receiving apparatus receives data into which a stuff pulse for frequency synchronization is inserted. The data receiving apparatus is provided with a frame alignment information detecting unit for detecting frame alignment information to establish a frame alignment from the received data, a stuff pulse insertion position detecting circuit for detecting the insertion position of the stuff pulse which has been inserted into the received data, and a frame pattern rearranging circuit for rearranging the frame pattern of the received data so that the insertion position of the stuff pulse is fixed at a predetermined position, on the basis of the detection output of the frame alignment information detecting unit and the detection output of the stuff pulse insertion position detecting circuit.

6 Claims, 9 Drawing Sheets

FAS: BIT 1

FAS: BIT 2

FAS : BIT 3

FAS : BIT 4

FAS : BIT 5

FAS : BIT 6

STUFF BITS

STUFF BITS

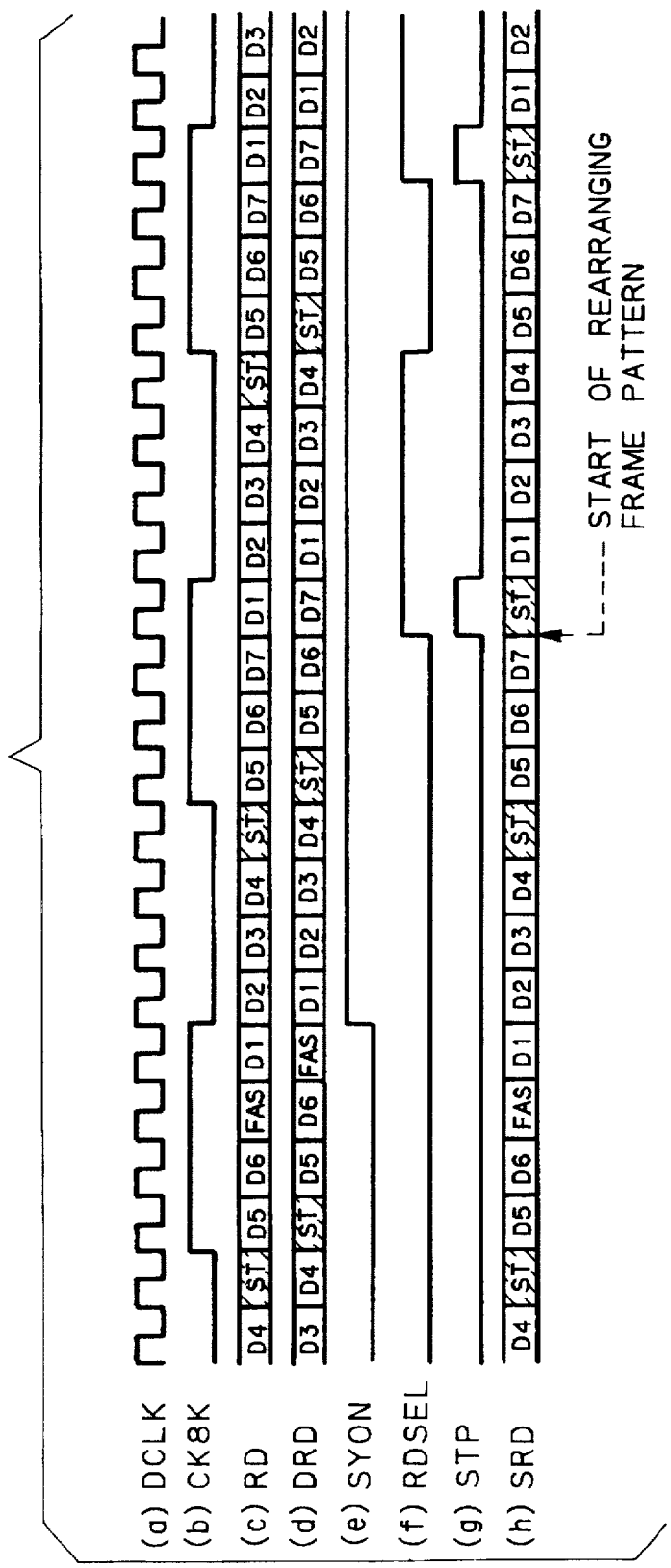

DATA RECEIVER FOR REARRANGING THE FRAME PATTERN OF DATA RECEIVED

BACKGROUND OF THE INVENTION

1. Field of the Invention

The present invention relates to a data receiving apparatus for receiving data into which a stuff pulse for establishing a frequency synchronization is inserted.

2. Description of the Background Art

Recently, in the field of data communications, there has been introduced a telecommunications network through which various kinds of data such as audio data, and image data are transmitted on an integrated basis, and which is called the integrated services digital network (ISDN). Accompanying this, there has also been an increased demand for a telecommunications service in which audio data and image data are transmitted together with each other, as in the video teleconferencing service. That is called audio-visual teleservice.

As the international standards of the audio-visual teleservice, there are ITU (International Telecommunication Union)-T (formerly CCITT) Recommendations H.320 and H.221.

ITU-T Recommendation H. 320 defines the technical standard of the narrow-band teleconferencing service, and specifically the structure of the service system, the conditions of terminals and the technical conditions of intercommunications with other terminals. Its frame structure is based on ITU-T Recommendation H. 221.

ITU-T Recommendation H. 221 defines the frame structures of channels from 64 Kbps to 1920 Kbps which are used in the audio-visual teleservice, such as video telephone and video conference.

ITU-T Recommendation H. 221 also defines the connection between one kind of terminals (referred to as "64K terminals" hereinafter) to be used for a data transmission rate of 64 Kbps and another kind of terminals (referred to as "56K terminal" hereinafter) to be used for a data transmission rate of 56 Kbps.

The data receiver for the 64K terminals serves to detect, upon receipt of data having a frame structure constituting of a plurality of octets, a frame alignment signal FAS for each bit to establish a frame alignment. According to such a data receiver, when the frame alignment is established, the initiation of the frame is detected on the basis of the position of the frame alignment signal FAS, and a frame counter is driven to detect the period of the frame.

As shown in FIG. 5, a received frame is treated inside of the receiver as a frame in which the frame alignment signal FAS is inserted into the bit position involved in virtual bit No. 8. In the figures, the letters F, B and E represent FAS, BAS and ECS signals, respectively. FIG. 5 typically shows the case in which the frame alignment signal FAS is received in such a state that it is inserted into the bit position involved in original bit No. 3.

Fixing the bit position into which the frame alignment signal FAS is inserted to virtual bit No. 8 permits the stuff pulse to appear on any of the seven bits involved in bit Nos. 1 to 7. Consequently, also after having established the frame alignment, there will exist seven kinds of frame patterns.

Determination of a bit position into which the stuff pulse is inserted, or the insertion position, based on an octet clock signal CK8K transmitted from a network, allows certain receiving processings, such as a series of processings from CRC operation to data separation. Data separation implies a processing such that the received data is separated into various kinds of data, such as AUDIO, LSD, MLP, HSD, and VIDEO.

However, according to the structure as mentioned above, the bit position into which the stuff pulse is inserted is not fixed. Consequently, the processing for separating the received data into appropriate kinds of data, particularly, the processing for generating enabling signals, is complicated. This involves such a problem that the circuit scale will be enlarged. This tendency will be emphasized in a communications system using a plurality of channels.

In view of the foregoing, for the 64K terminal based on ITU-T Recommendation H. 320, it is desired to provide a data receiver capable of avoiding an enlargement in circuit scale due to the unfixed position of the pulse stuffing.

SUMMARY OF THE INVENTION

It is therefore an object of the present invention to provide a data receiving apparatus which is not increased in circuit scale for separating received data into appropriate kinds of data even when the bit position in which a stuff pluse is inserted is not fixed.

According to the invention, a data receiving apparatus for receiving data into which a stuff pulse for a frequency synchronization is inserted, comprising: a frame alignment information detecting unit for detecting frame alignment information to establish a frame alignment from received data; a stuff pulse insertion position detecting circuit for detecting an insertion position of the stuff pulse which has been inserted to the received data; and a frame pattern rearranging circuit for rearranging a frame pattern of the received data so that the insertion position of the stuff pulse is fixed at a predetermined position, on the basis of a first detection output of the frame alignment information detecting unit and a second detection output of the stuff pulse insertion position detecting circuit.

In the arrangement mentioned above, when data is received, the frame alignment information detecting unit detects the frame alignment information from the received data. Thus, it is possible to determine the top of the received frame, whereby the insertion position of the stuff pulse after having rearranged the frame pattern is determined.

Further, when data is received, the stuff pulse insertion position detecting circuit detects an insertion position of the stuff pulse which has been inserted to the received data. Thus, it is possible to determine the insertion position of the stuff pulse before the frame pattern is rearranged.

The frame pattern is rearranged so that the insertion position of the stuff pulse is fixed at a predetermined position, on the basis of the first detection output and the second detection output.

Thus, even when the insertion position of the stuff pulse is not fixed, it is possible to restrict the frame patterns to one kind of pattern, thereby reducing the circuit scale required for separating the received data to appropriate kinds of data.

BRIEF DESCRIPTION OF THE DRAWINGS

The objects and features of the present invention will become more apparent from consideration of the following detailed description taken in conjunction with the accompanying drawings in which:

FIG. 7 is a timing chart useful for understanding rearrangement of a frame pattern according to the embodiment of the present invention.

DESCRIPTION OF THE PREFERRED EMBODIMENT

A preferred embodiment of the present invention will be described in which the invention is applied to a data receiving apparatus for 64K terminals, such as a video telephone terminal or a video conference terminal, which serve to perform the audio-visual teleservice based on ITU-T Recommendation H. 320. Thus, for the purpose of better understanding of the present invention, before dealing with the embodiment of the invention, the structure of the transmission and received frames for the 64K terminal in a communication between a 64K terminal and a 56K terminal will be described.

Figure 2:
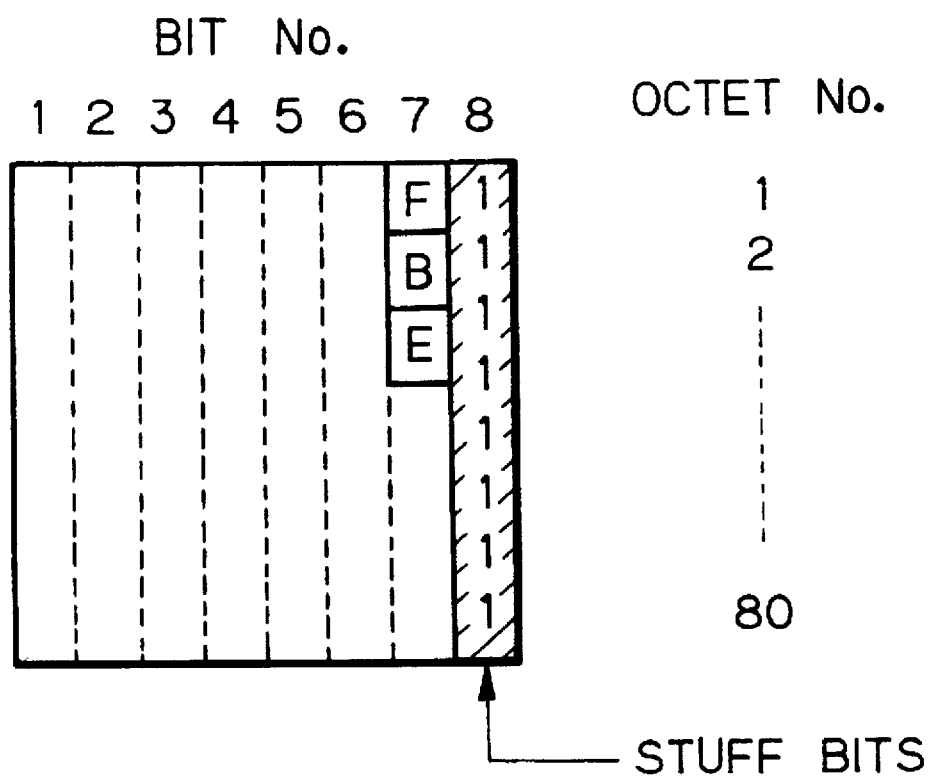
FIG. 2 illustrates an example a transmission frame for 64K terminals for use in a communication between a 64K terminal and a 56K terminal.

FIG. 2 shows an example of the structure of a transmission frame for the 64K terminal in the case where data are transmitted from the 64K terminal to the 56K terminal. As shown in FIG. 2, the transmission frame consists of 80 octets. For each octet, a pulse stuffing is inserted into the bit position involved in bit No. 8. FIG. 2 shows such a case that the binary value of the pulse stuffing is "1", and the frame alignment signal FAS is inserted into the bit position involved in bit number No. 7 of each of the specific eight octets, i.e. the first through eighth octets. Further, it is assumed that a bit-rate allocation signal BAS is inserted into the bit position involved in bit No. 7 of each of the specific eight octets, i.e. the ninth through 16th octets. Furthermore, it is assumed that an encryption control signal ECS is inserted into the bit position involved in bit No. 7 of each of the specific eight octets, i.e. 17th through 24th octets. In the figures, the letters F, B and E represent FAS, BAS and ECS signals, respectively.

Figure 3:
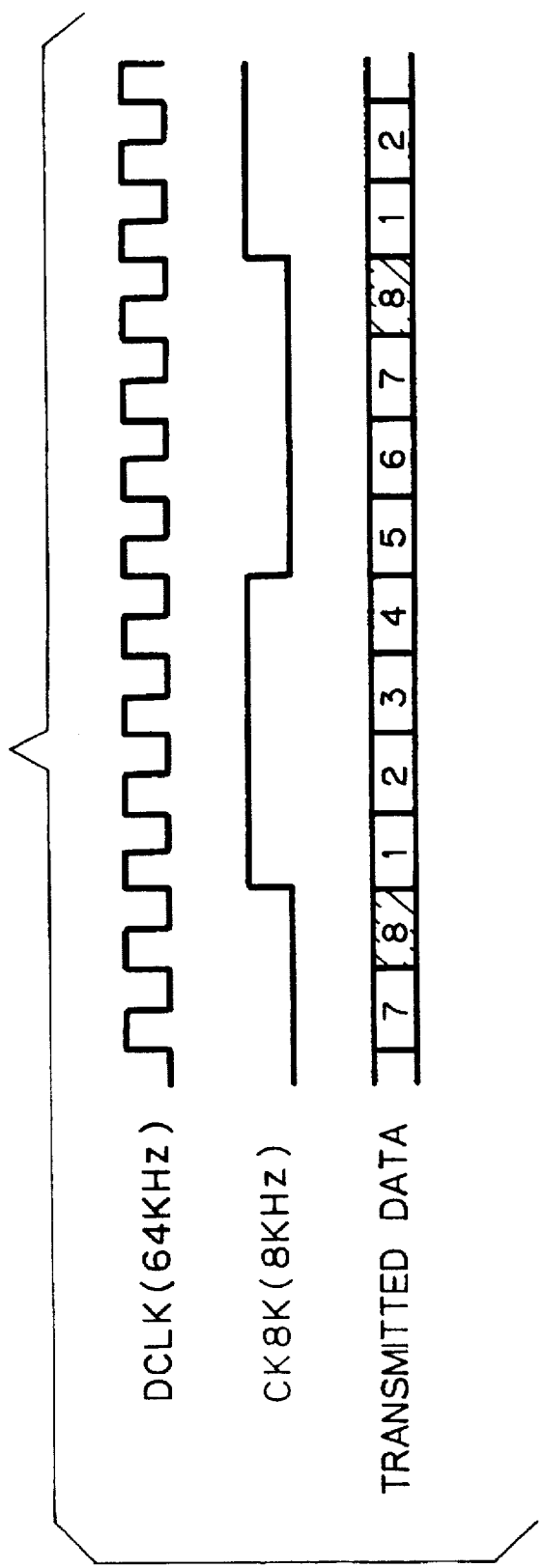
FIG. 3 is a timing chart useful for understanding the transmitting operation of a 64K terminal in a communication between a 64K terminal and a 56K terminal.
Figure 4A:
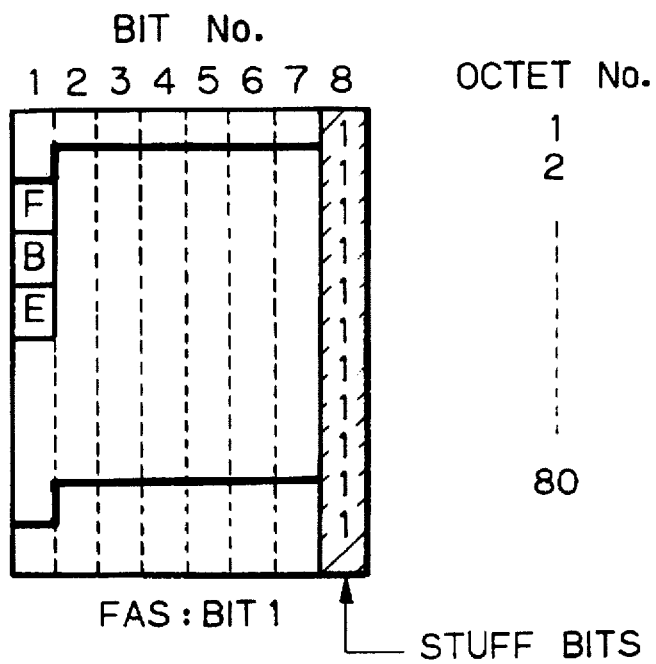
FIGS. 4A–4G illustrate an example of the received frames of a 64K terminal in a communication between a 64K terminal and a 56K terminal.
Figure 4B:
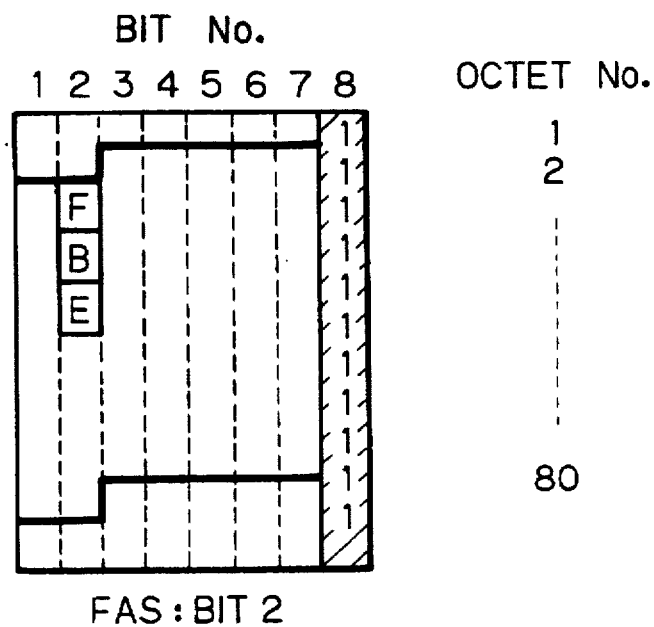
Figure 4C:
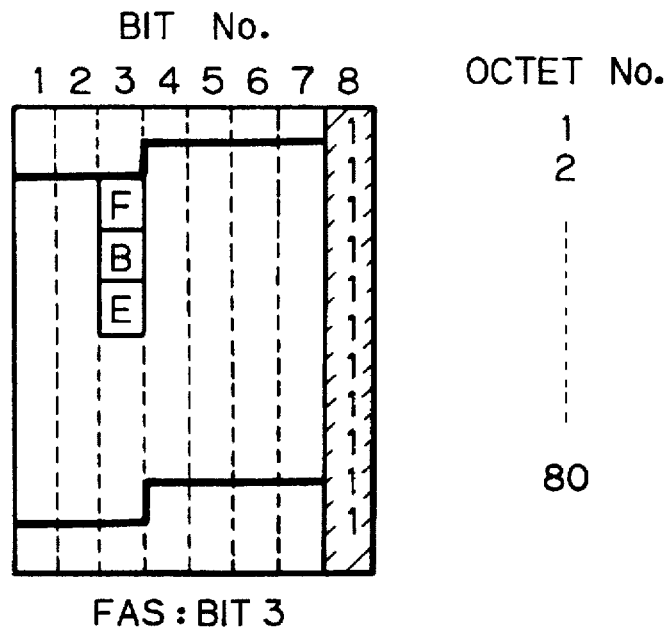
Figure 4D:
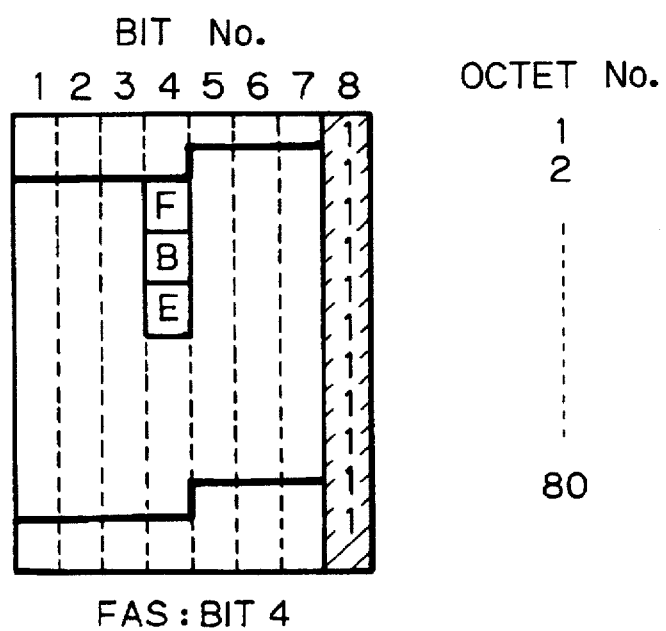
Figure 4E:
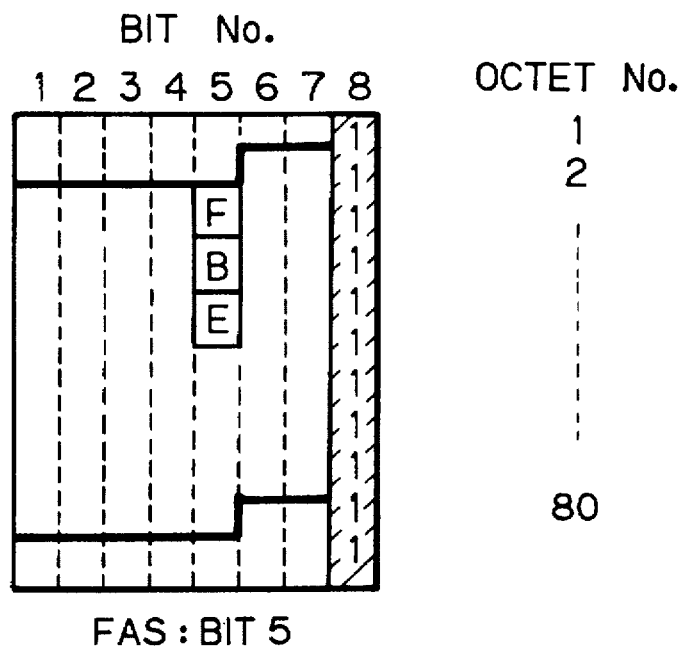
Figure 4F:
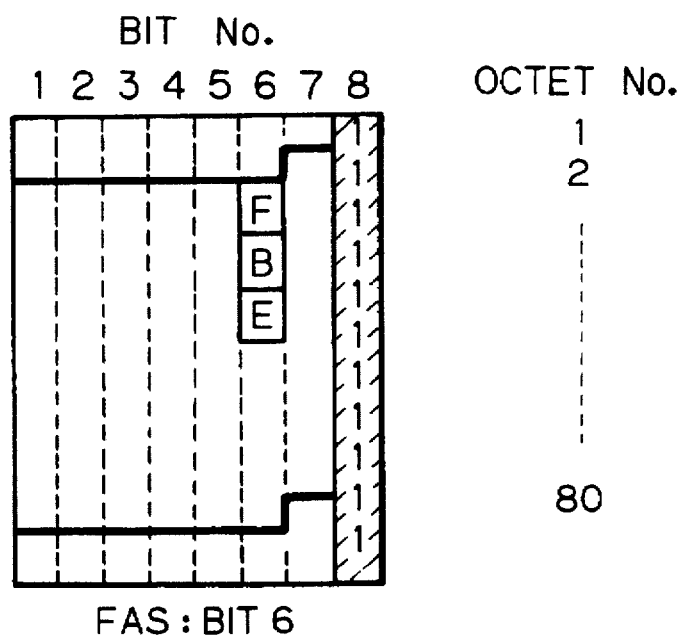
Figure 4G:
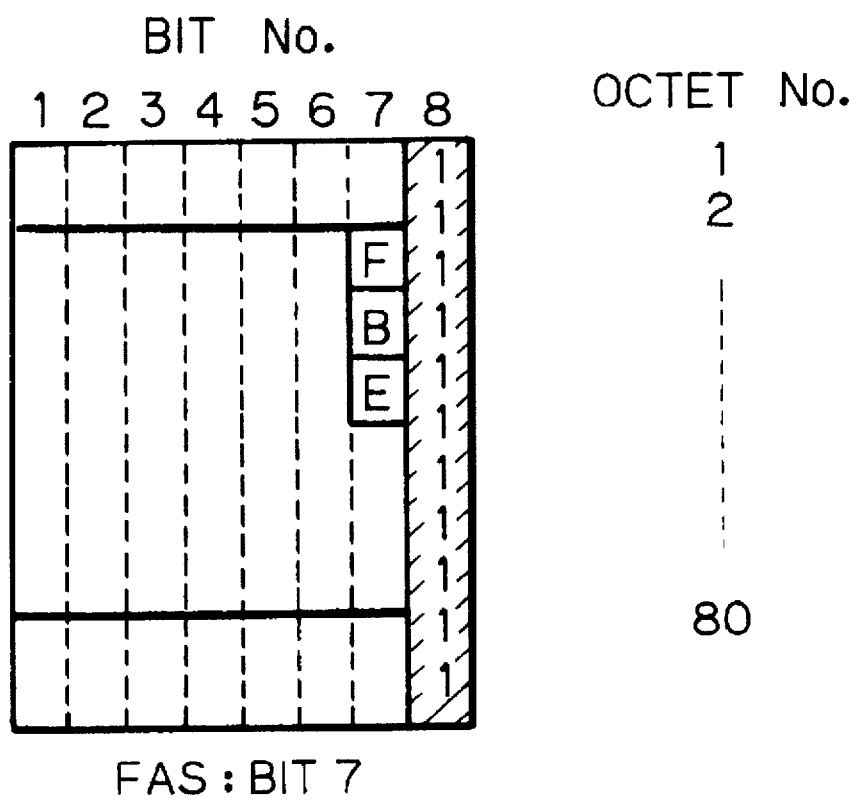

The transmission data having the frame structure as mentioned above are transmitted on a bit serial basis in synchronism with a data clock signal DCLK of 64 KHz, as shown in FIG. 3. The transmission data are sent out in such a phase that the trailing edge of an insertion position (stuff bit position) in which a stuff pulse is inserted matches the timing of the positive-going edge of an octet clock signal CK8K of 8 KHz supplied through a network. In the figures, the positions in which a stuff bit is inserted are shaded. The data transmitted to the network are sent out to the 56K terminal in response to the octet clock signal CK8K with the stuff pulse or pulse stuffing removed.

FIGS. 4A–4G show the structure of received frames for 64K terminals in a communication between a 64K terminal and a 56K terminal. As seen from FIGS. 4A–4B, also in the received frame, for each octet, a pulse stuffing is inserted into the bit positions involved in bit No. 8. Those pulses stuffing are appended in the network.

However, in those received frames, as shown in FIGS. 4A–4G, the frame alignment signal FAS may appear on any of the seven bits involved in the bit Nos. 1 through 7. Hence, there exist seven kinds of frame patterns in respect to the received frame. In FIGS. 4A–4G, the portions between the pair of thick lines indicate each the transmission frame transmitted from the 56K terminal.

Figure 1:
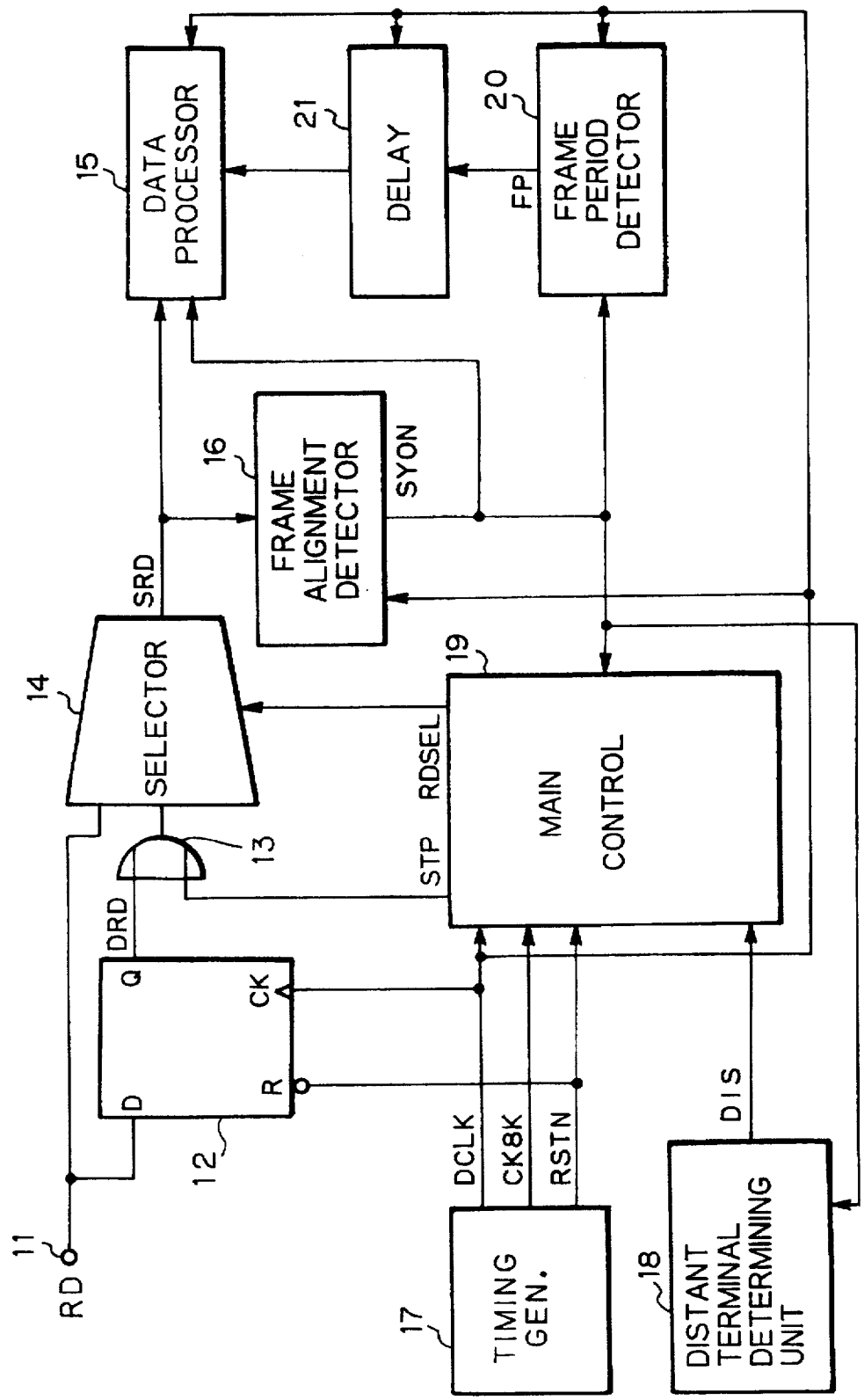
FIG. 1 is a schematic block diagram showing a data receiving apparatus according to a preferred embodiment of the present invention.

Now, a preferred embodiment of the present invention will be described referring to FIG. 1. In FIG. 1, a data receiving apparatus for 64K terminals comprises a D flip-flop circuit 12 for providing received data RD, supplied on an input terminal 11, with a delay of a period corresponding to one clock of a data clock signal DCLK. The flip-flop 12 has a Q output port connected to an OR circuit 13, which is adapted for inserting a stuff pulse STP into received data DRD obtained through the delay of the D flip-flop circuit 12. The OR gate 13 has an output port interconnected to a selector 14 which is adapted to select either the received data RD entered on the input terminal 11 or the received data DRD outputted from the OR gate circuit 13.

The receiver apparatus also comprises a data processing unit 15 for practicing processings on received data SRD resultant from the selection made by the selector 14, where the processings imply, for example, a series of processings from the CRC operation to the data separation. Also connected to the output SRD from the selector 14 is a frame alignment detection unit 16 for detecting a frame alignment word, which consists of frame alignment signals FAS for even-numbered frames and frame alignment signals FAS for odd-numbered frames, thereby detecting that the frame alignment is established.

The receiver apparatus further includes a timing generating circuit 17 for outputting a data clock signal DCLK of 64 KHz bit-synchronized with the received data, an octet clock signal CK8K supplied from a network, not shown, connected to the receiver apparatus, a reset signal RSTN for initializing the constituent elements of the apparatus, and the like. A distant terminal determining unit 18 is provided for exchanging the ability of the bit-rate allocation signal BAS after the frame alignment has been established to determine whether or not a distant terminal is a 56K terminal.

The receiver apparatus includes a main control 19 for outputting the stuff pulses STP and a selection signal RDSEL to control the selecting operation of the selector 14 on the basis of a frame alignment detection signal SYON outputted from the frame alignment detection unit 16, the data clock signal DCLK, the octet clock signal CK8K, the reset signal RSTN, which are outputted from the timing generating circuit 17, and a distant terminal determination signal DIS outputted from the distant terminal determining unit 18.

In the receiver apparatus, a frame period detecting unit 20 is provided for detecting the period of each of the frames on the basis of a frame alignment detection signal SYON outputted from the frame alignment detection unit 16. The frame period detecting unit 20 detects the period of each of the frames in such a manner that when a frame alignment is established, the top of the frame is found from the position of the frame alignment signal FAS, so that the data clock signals DCLK are counted. The frame period detector 20 has an output FP interconnected to a delay unit 21 which is adapted for providing a delay for a frame period detection signal FP, outputted from the frame period detecting unit 20, by a period corresponding to one clock of the data clock signal DCLK.

The basic technical concept of the present embodiment is to rearrange a frame pattern of received data, when it is determined through exchanging the ability of the bit-rate allocation signal BAS that the instant terminal is a 56K terminal, so that the insertion position of a stuff pulse is fixed at a predetermined bit position. According to the concept, it is possible to reduce the seven kinds of frame patterns, which would otherwise be provided in compliance with the insertion position of the stuff pulse, to a single kind of frame pattern through fixing the frame alignment signal FAS at the bit position involved in virtual bit No. 8, thereby simplifying the structure required for separating the received data to the appropriate kinds of data.

Figure 6:
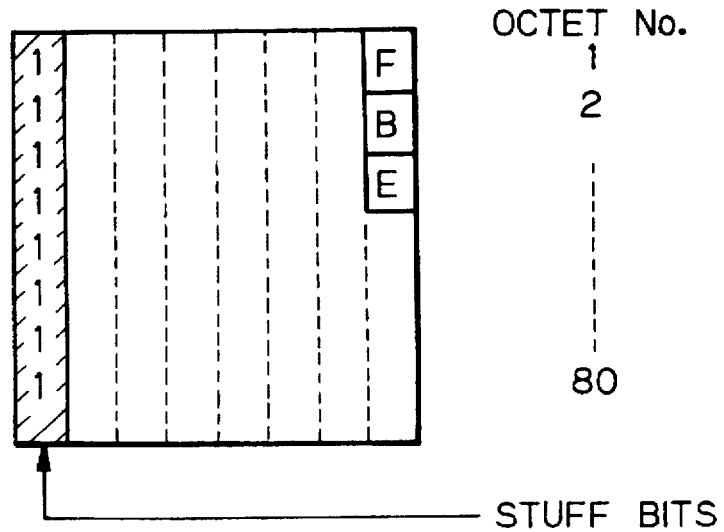
FIG. 6 illustrates an example of a received frame after a frame pattern has been rearranged according to the embodiment of the present invention.

In the case where the insertion position of the stuff pulse is newly set up, it may optionally be set up to any bit position. In this respect, according to the present embodiment, as shown in FIG. 6, the insertion position is set up to the bit position involved in virtual bit number No. 1. The reason for doing so is that circuits of the data receiving apparatus may be partially used in common with those of the data transmitter. Specifically, according to the arrangement mentioned above, when the received data is shifted in such a manner that the insertion position of the frame alignment signal FAS in the receiving frame coincides with the insertion position of the frame alignment signal FAS in the transmission frame, it is possible to obtain a match between the insertion position of the stuff pulse ST in the received frame and the insertion position of the stuff pulse ST in the transmission frame.

Thus, the use of means for performing the shift operation mentioned above permits the received frame to be treated with a frame pattern which is completely the same as the transmission frame. As a result, circuits of the data receiving apparatus may be partially used in common with those of the data transmitter.

Such a shift as mentioned above can be implemented, for example, in such a way that the timing at which the frame counter starts counting is delayed by the period corresponding to one clock of the data clock signal DCLK. On the other hand, it is also possible to implement such a shift by means of delaying the generated signal (e.g. frame period detection signal FD and a like) by the period corresponding to one clock of the data clock signal DCLK without changing the timing at which the frame counter starts counting. In the present embodiment, the latter scheme is adopted.

Next, referring to the timing chart with parts (a)–(h) in FIG. 7, the operation of the present embodiment will be described in detail. In FIG. 7, the letters ST denote a stuff pulse which is already inserted into the received data; STP denotes a stuff pulse which is to be newly inserted by rearranging the frame pattern; and D1–D7 each denote a bit of data inserted into the octets.

The input terminal 11 receives the data RD as shown in part (c) of FIG. 7. In FIG. 7, there is illustrated the received data RD having a frame pattern in which the stuff pulse ST is inserted into the bit position involved in virtual bit No. 5.

The received data RD is supplied to a data input terminal D of the D flip-flop circuit 12 and one of input terminals of the selector 14. The received data RD fed to the D flip-flop circuit 12 is delayed by a period corresponding to one clock in response to the data clock signal DCLK, part (a) of FIG. 7, outputted from the timing generating circuit 17. Thus, as shown in part (d) of FIG. 7, there is obtained received data DRD which is delayed by the period corresponding to one clock with respect to the received data RD.

The received data DRD is in turn supplied to one of input terminals of the OR circuit 13. Supplied to another input terminal of the OR gate circuit 13 is the stuff pulse STP, as shown in part (g) of FIG. 7, from the main control 19. Thus, from the output terminal of the OR gate circuit 13 there will be obtained the received data DRD into which the stuff pulses ST and STP are inserted. The received data DRD thus obtained is supplied to another input terminal of the selector 14. The selector 14 selects either the received data RD or DRD in response to the selection signal RDSEL supplied from the main control 19.

In this case, usually, the selector 14 selects only the received data RD. On the contrary, if it is determined that the distant terminal is a 56K terminal by exchanging the ability of the bit-rate allocation signal BAS, after having established the frame alignment, then the selector 14 selects alternately the received data RD and DRD in a predetermined timing. Thus, it is possible to obtain from the selector 14 received data SRD in which the frame pattern is rearranged so that the stuff pulse is fixed at a predetermined position.

If the frame alignment is not established, then, in the selector 14, as mentioned above, the received data RD is selected as the received data SRD. The received data SRD is supplied to the data processing unit 15 and the frame alignment detection unit 16.

Upon receipt of the received data SRD, the frame alignment detection unit 16 carries out the processing to detect a frame alignment word consisting of frame alignment signals FAS for even-numbered frames and frame alignment signals FAS for odd-numbered frames. When the frame alignment word is detected by the processing, this implies that frame alignment is established.

When the frame alignment is established, the frame alignment detection unit 16 switches the level of the frame alignment detection signal SYON from its low level to its high level at the timing of a predetermined bit, for example, at the trailing edge of the bit involved in virtual bit No. 1, of the received data RD, as exemplified in part (e) of FIG. 7. The frame alignment detection signal SYON is fed to the distant terminal determining unit 18, the main control 19 and the frame period detecting unit 20.

The distant terminal determining unit 18 determines whether or not the distant terminal is a 56K terminal through exchanging the ability of the bit-rate allocation signal BAS, when the frame alignment detection signal SYON is switched from its low to high levels. If the distant terminal determining unit 18 has determined that the distant terminal is a 56K terminal, then it sets up the distant terminal identification signal DIS to its active state.

When the distant terminal identification signal DIS becomes in the active state, the main control 19 determines the insertion position of the stuff pulse STP, in other words, the bit position involved in the virtual bit No. 1 of the received data RD, on the basis of the frame alignment detection signal SYON. Upon detection of this bit position, the main control 19 outputs, as shown in part (g) of FIG. 7, the stuff pulse STP and switches the selection signal RDSEL from its low level to its high level at the timing of the leading edge of the bit of interest, as shown in part (f) of FIG. 7.

Figure 5:
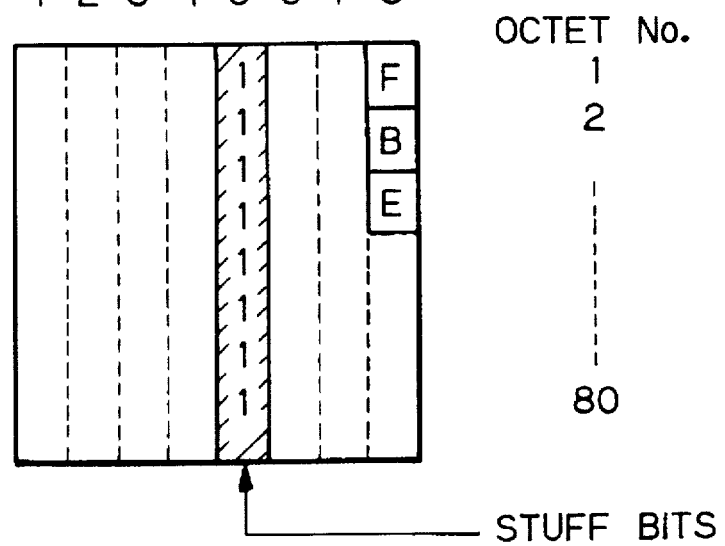
FIG. 5 illustrates an example of a received frame of a 64K terminal in the case where a frame alignment signal FAS is fixed at the bit position involved in virtual bit No. 8.

When the frame alignment detection signal SYON is switched in level from its low level to its high level, the main control unit 19 detects the insertion position of the stuff pulse ST in response to the octet clock signal CK8K. It is noted that FIG. 7 typically illustrates such a case that the stuff pulse ST is inserted into the bit position involved in virtual bit No. 5 of the received data RD, as in the application shown and described with reference to FIG. 5.

Having detected the bit of interest, the main control unit 19 switches the selection signal RDSEL in level from its high level to its low level at the timing of the trailing edge of the bit of interest. Thus, the selection signal RDSEL is switched in level from its high level to its low level at the timing of the positive-going edge of octet clock signal CK8K as shown in part (c) of FIG. 7.

In summary, the selection signal RDSEL is switched in level from its low level to its high level at the leading edge of the insertion bit of the stuff pulse STP, and is switched in level from its high to low level at the timing of the trailing edge of the insertion bit of the stuff pulse ST.

The stuff pulse STP generated by the main control unit 19 is fed to the OR gate circuit 13, so that the stuff pulse STP is inserted into the bit position involved in virtual bit No. 8 of the received data DRD, or the bit position involved in virtual bit No. 1 of the received data RD.

The selection signal RDSEL is fed to the selector 14. In the case where the selection signal RDSEL is at its high level, the selector 14 selects an output of the OR gate circuit 13. On the other hand, the low level of the selection signal RDSEL causes the selector 14 to select the received data RD. Consequently, the stuff pulse STP and the data D1–D4 are selected from the output of the OR gate circuit 13, and then the data D5–D7 are selected from the received data RD.

As a result, as shown in part (h) of FIG. 7, the stuff pulse STP is inserted into the bit position involved in virtual bit No. 1 of the received data RD. The stuff pulse ST, which has been inserted in the bit position involved in virtual bit No. 5, is deleted and the received data SRD keeping the continuity of 7 data D1–D7 are obtained. The received data SRD is fed to the data processing unit 15.

When the frame alignment detection signal SYON is switched in level from its low level to its high level, the frame period detecting unit 20 finds the top portion of the receiving frame from the insertion position of the frame alignment signal FAS which has been inserted in the the received data RD, and drives the frame counter from that time, thereby detecting the period of the receiving frame to produce the frame period detection signal FD.

The frame period detection signal FD is in turn delayed by the delay unit 21 by a period corresponding to one clock of the data clock signal DCLK, and is then fed to the data processing unit 15. When the frame alignment detection signal SYON is switched in level from its low level to high level, the data processing unit 15 practices the processings to the received data SRD in response to the frame period detection signal FD delayed by the period corresponding to one clock, so that the received data SRD may be processed with the same frame pattern as the transmitted data of a 64K terminal.

According to the present embodiment of the invention described above, it is possible to expect the following advantages:

(1) First, according to the present embodiment, the frame pattern of the received data RD is rearranged so that the insertion position of the stuff pulse is fixed at the predetermined position. This feature makes it possible to restrict the frame patterns of the received data to a single kind of pattern. Thus, it is possible to prevent an increment of the circuit scale required for separating the received data to appropriate kinds of data.

(2) Further, according to the present embodiment, the frame pattern of the received data RD is rearranged in such a manner that the received data DRD, which is obtained through delaying the received data RD by a period corresponding to one clock, is prepared, and the received data DRD thus prepared and the received data RD are alternately selected. This feature makes it possible to rearrange the frame pattern without using a memory device such as a first-in-first-out memory. Thus, it is possible to rearrange the frame pattern on a real time basis without bringing about an out-of-frame alignment, thereby proceeding to the processings promptly after having determined that the distant terminal is a 56K terminal.

(3) Furthermore, according to the present embodiment, in order to fix the insertion position of the stuff pulse, the insertion position is fixed at the bit position involved in virtual bit No. 1, and in addition the frame period detection signal FP is delayed by a period corresponding to one clock. This feature makes it possible to treat the received data RD with the same frame pattern as transmission data. Thus, it is possible to use a lot of circuits in common with those of the data transmitter within a terminal.

While the present invention has been described in detail referring to the specific embodiment described above, the invention is not restricted to the above-mentioned embodiment.

For example, according to the above-mentioned embodiment, there is described the case where the present invention is applied to a data receiving apparatus of 64K terminals, such as a video telephone terminal or a video conference terminal, which serve to perform an audio-visual teleservice based on ITU-T Recommendation H. 320. It should be noted, however, that the present invention is also applicable to a data receiving apparatus of 64K terminals based on ITU-T Recommendation H.221 only.

Further, the above-described embodiment is directed to an application where the present invention is applied to a data receiving apparatus adapted to receive data with the insertion position of the stuff pulse not fixed. It should be noted, however, that the present invention is also applicable to a data receiving apparatus adapted to receive data with the insertion position of the stuff pulse fixed. In the latter case, as to the insertion position of the stuff pulse, it is possible to detect the insertion position on the basis of the octet clock signal if it is transmitted. On the other hand, if the octet clock signal is not transmitted, it is possible to detect the insertion position on the basis of an output obtained from the detected frame alignment information such as the frame alignment word.

In summary, the present invention is generally applicable to a data receiving apparatus for receiving data to which a stuff pulse for frequency synchronization is inserted, specifically to a data receiving apparatus for receiving data which is sent out from an apparatus of which the data transmission rate or bit rate is lower than that of the receiving apparatus itself, and to which data a stuff pulse for frequency synchronization is inserted at a data transmission path of a network or the like.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A data receiving apparatus for receiving data into which a stuff pulse for frequency synchronization is inserted, comprising:

a frame alignment information detecting unit for detecting frame alignment information to establish a frame alignment from received data;

a stuff pulse insertion position detecting circuit for detecting an insertion position of the stuff pulse which has been inserted into the received data; and a frame pattern rearranging circuit for rearranging a frame pattern of the received data so that the insertion position of the stuff pulse is fixed at a predetermined position, on the basis of a first detection output of said frame alignment information detecting unit and a second detection output of said stuff pulse insertion position detecting circuit, wherein said frame pattern rearranging circuit comprises a received data delaying unit for delaying the received data by a period corresponding to one clock of a data clock signal synchronized with the received data, a stuff pulse insertion circuit for inserting the stuff pulse into either the received data delayed by said received data delaying unit or non-delayed received data on the basis of the first detection output, and a data selector for selecting alternately the received data into which the stuff pulse is inserted by said stuff pulse insertion position detecting circuit and non-inserted received data, on the basis of the first detection output and the second detection output, to obtain the received data rearranged in the frame pattern so that the insertion position of the stuff pulse is fixed at the predetermined position.

2. A data receiving apparatus for receiving data into which a stuff pulse for frequency synchronization is inserted, comprising:

a frame alignment information detecting unit for detecting frame alignment information to establish a frame alignment from received data;

a stuff pulse insertion position detecting circuit for detecting an insertion position of the stuff pulse which has been inserted into the received data; and a frame pattern rearranging circuit for rearranging a frame pattern of the received data so that the insertion position of the stuff pulse is fixed at a predetermined position, on the basis of a first detection output of said frame alignment information detecting unit and a second detection output of said stuff pulse insertion position detecting circuit, wherein said frame pattern rearranging circuit rearranges the frame pattern in such a manner that, when the received data is shifted so that the insertion position of the frame alignment information in a received frame coincides with the insertion position of the frame alignment information in a transmission frame, the insertion position of the stuff pulse in the received frame coincides with the insertion position of the stuff pulse in the transmission frame.

3. An apparatus according to claim 2, further comprising a data shifting circuit for shifting the received data, which is rearranged in the frame pattern by said frame pattern rearranging circuit, so that the insertion position of the stuff pulse in the received frame coincides with the insertion position of the stuff pulse in the transmission frame.

4. A data receiving apparatus for receiving data into which a stuff pulse for frequency synchronization is inserted, comprising:

frame alignment information detecting means for detecting frame alignment information to establish a frame alignment from received data;

stuff pulse insertion position detecting means for detecting an insertion position of the stuff pulse which has been inserted into the received data; and frame pattern rearranging means for rearranging a frame pattern of the received data so that the insertion position of the stuff pulse is fixed at a predetermined position, on the basis of a first detection output of said frame alignment information detecting means and a second detection output of said stuff pulse insertion position detecting means, wherein said frame pattern rearranging means comprises received data delaying means for delaying the received data by a period corresponding to one clock of a data clock signal synchronized with the received data, stuff pulse insertion means for inserting the stuff pulse into either the received data delayed by said received data delaying means or non-delayed received data on the basis of the first detection output, and data selector means for selecting alternately the received data into which the stuff pulse is inserted by said stuff pulse insertion position detecting means and non-inserted received data, on the detecting means and non-inserted received data, on the basis of the first detection output and the second detection output, to obtain the received data rearranged in the frame pattern so that the insertion position of the stuff pulse is fixed at the predetermined position.

5. A data receiving apparatus for receiving data into which a stuff pulse for frequency synchronization is inserted, comprising:

frame alignment information detecting means for detecting frame alignment information to establish a frame alignment from received data;

stuff pulse insertion position detecting means for detecting an insertion position of the stuff pulse which has been inserted into the received data; and frame pattern rearranging means for rearranging a frame pattern of the received data so that the insertion position of the stuff pulse is fixed at a predetermined position, on the basis of a first detection output of said frame alignment information detecting means and a second detection output of said stuff pulse insertion position detecting means, wherein said frame pattern rearranging means rearranges the frame pattern in such a manner that, when the received data is shifted so that the insertion position of the frame alignment information in a received frame coincides with the insertion position of the frame alignment information in a transmission frame, the insertion position of the stuff pulse in the received frame coincides with the insertion position of the stuff pulse in the transmission frame.

6. An apparatus according to claim 5, further comprising data shifting means for shifting the received data, which is rearranged in the frame pattern by said frame pattern rearranging means, so that the insertion position of the stuff pulse in the received frame coincides with the insertion position of the stuff pulse in the transmission frame.

* * * * *